April 28, 1970  E. A. RICHARDS  3,508,450
MECHANICAL DRIVE TRANSMISSION
Filed Jan. 25, 1968  8 Sheets-Sheet 1

INVENTOR.
ELMER A. RICHARDS
BY
ATTORNEYS

Fig_6A_

United States Patent Office 3,508,450
Patented Apr. 28, 1970

3,508,450
MECHANICAL DRIVE TRANSMISSION
Elmer A. Richards, Kalamazoo, Mich., assignor to
Caterpillar Tractor Co., Peoria, Ill., a corporation
of California
Filed Jan. 25, 1968, Ser. No. 700,602
Int. Cl. F16h 3/12, 5/36; F16d 67/00
U.S. Cl. 74—340                                    16 Claims

ABSTRACT OF THE DISCLOSURE

A transmission has clutches which disconnect the gears from both the transmission input and output during a shift. Powered mechanisms operate the clutches, stop the gears, change the drive ratio while the gears are stationary, and then accelerate the gears and restore the original clutch positions. An additional clutch may couple the input to the output to provide continuous through drive during the shift transient. No synchronizers are needed, and all possible power paths through the gears may readily be used to provide a large number of speed ranges in a very compact unit.

BACKGROUND OF THE INVENTION

This invention relates to torque transmitting mechanism and more particularly to mechanical transmissions of the class providing for a plurality of drive ratios between driving and driven elements of a vehicle or other powered apparatus.

The standard mechanical transmission as used in motor driven vehicles and certain other powered systems is relatively compact, inexpensive, and highly efficient under non-transient conditions. Notwithstanding these advantages, mechanical transmissions as heretofore constructed have certain disadvantages which have resulted in the widespread use of more costly and complex types of transmission. Satisfactory shifting of the standard mechanical transmission requires considerable operator skill and, at best, involves loss of power to the driven member. Several factors contribute to this inefficiency during a shift. For example, the transmission is disconnected from the engine during the shifting period so that the engine power output during this interval is unused rather than being delivered to the wheel drive line. The loss of power is compounded in that it is customary to make such shifts with the engine at part throttle. This brings about a deceleration of the vehicle and the speed reduction must be regained after the shift is completed. The engine deceleration energy is wasted in the form of heat; and such losses are a significant factor in the overall vehicle efficiency, particularly where the vehicle is operated under conditions requiring frequent shifts.

In certain specialized circumstances, the requirement that the transmission be disconnected from the engine during shifting creates severe problems. A gas turbine engine with a free power turbine, for example, may be damaged or destroyed as a result of unrestrained acceleration if the load is abruptly removed.

A further and extremely significant problem with standard mechanical transmissions is the need for synchronizing mechanisms to provide for the engagement of gears which may have unmatched angular velocities as shifting is initiated. Such synchronizers complicate the structure and add appreciably to the size, cost, and maintenance problems associated therewith. An interesting consequence of the need for synchronizers is that, aside from very simple transmissions, it is generally impractical to utilize all the theoretically available power paths which might be obtainable by different combinations of a given set of gears. A conventional multi-speed range mechanical transmission having the necessary number of synchronizers for this purpose would be of excessive size.

To resolve some of the problems discussed above, transmissions having various forms of fluid drive, planetary gear sets, and combinations thereof have been developed and are extensively employed in automobiles, trucks, tractors, and the like. These mechanisms may provide automatic shifting with continuous drive and are much less dependent on operator skill for effective operation. However, these forms of transmission tend to be mechanically complex and costly and have an inherently large friction loss which is most pronounced at high speeds. Aside from the shifting transient conditions discussed above, such transmissions are markedly less efficient than the standard mechanical types.

Accordingly, many benefits can be realized by basically changing the mechanical transmission to improve performance in the several respects discussed above while retaining the present advantages of such transmissions.

SUMMARY OF THE INVENTION

The present invention is a more efficient mechanical transmission which provides for shifting by a simple movement of a control lever, at full throttle if desired and without requiring direct manipulation of a clutch by the operator. The mechanism is compact in that no synchronizers are required while all possible power paths through the change speed gearing may be utilized, if necessary, without excessive structural complication to provide a maximum number of speed ranges with a minimum number of gears.

The invention avoids the need for complex synchronizing mechanisms by utilizing a clutch at both the input and output of the transmission to disconnect the change speed gearing from both the engine and the drive line during the shifting period. Concurrently, an internal brake momentarily stops all of the gears so that shifting can take place under the condition at which all gears are inherently synchronized, specifically with all gears stationary, or near stationary. The system functions automatically to accelerate the gears after shifting and then to recouple the gear section back into the power path, to complete the shift. To maintain a continuous drive connection during shifting, an additional clutch mechanism may be arranged to couple the drive line directly to the engine at such times. The additional clutch has a predetermined capacity which provides for slipping, when appropriate, to avoid difficulties from torque mismatches. To avoid abrupt shock loads, means may be included for automatically varying the input clutch torque capacity in response to variations in input speed.

The invention provides still other improvements which facilitate the mode of transmission operation discussed above and which will be hereinafter described.

Accordingly, it is an object of this invention to provide a compact multi-speed range mechanical transmission having greater efficiency and superior performance during shifts.

It is another object of the invention to provide a mechanical transmission which may maintain a substantially continuous driving connection between an engine and drive line during speed range changes, requires no synchronizers, and which may utilize all possible power paths through the change speed gears.

It is still another object of this invention to provide a mechanical transmission having the superior shifting performance of power shift transmissions.

DESCRIPTION OF A PREFERRED EMBODIMENT

Figures 1, 6:
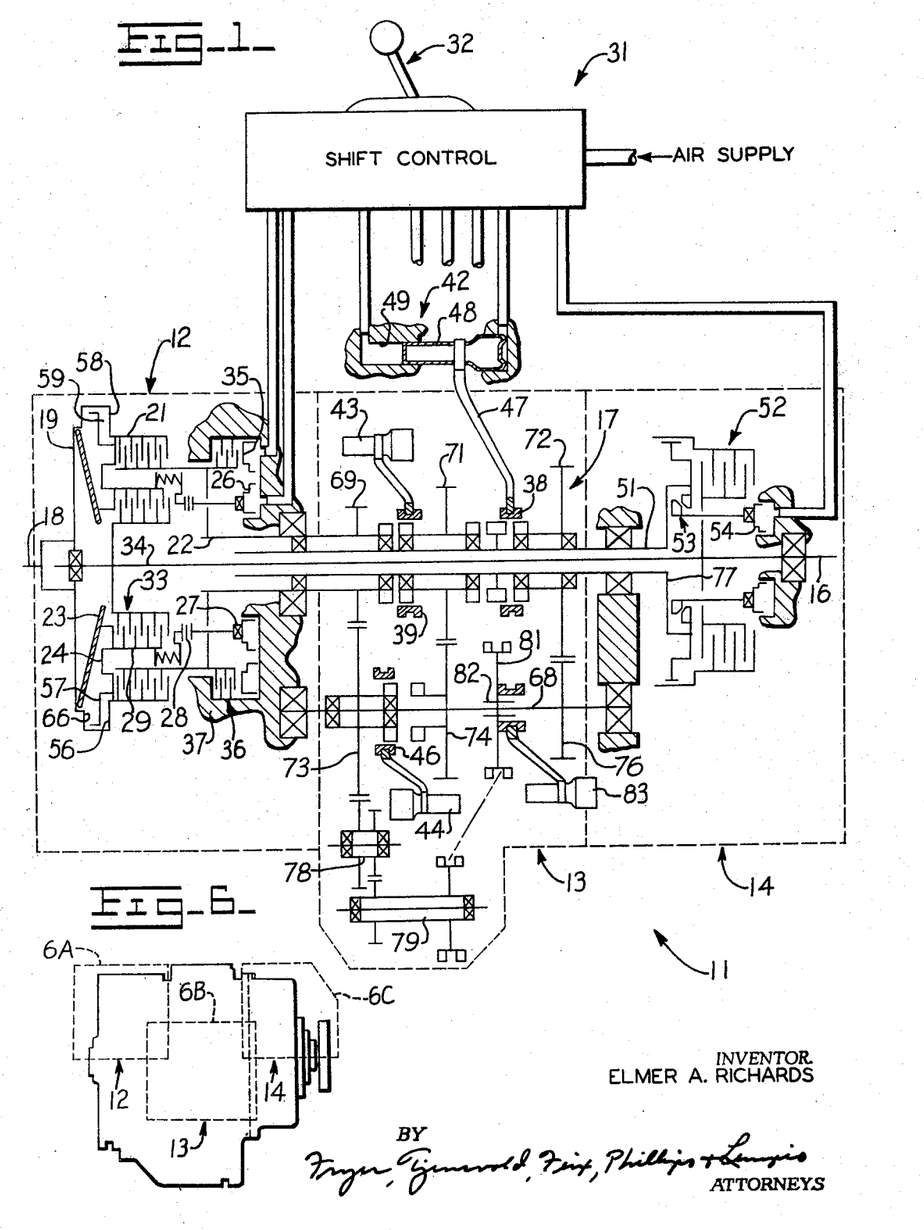
FIG. 1 is a schematic diagram of a vehicle transmission illustrating basic components and principles of operation of the invention.
FIG. 6 is an exterior elevation view of a transmission embodying the components and principles of operation shown schematically in FIG. 1.

Referring now to FIG. 1, a transmission 11 in accordance with the invention is shown in diagrammatic form to facilitate understanding of the basic principles and mode of operation thereof, suitable detailed mechanical structure for the several components of a representative embodiment being hereinafter described. The transmission 11 may be considered as comprised of three principal sections, an input or clutch cluster section 12 which may be coupled to the driving engine of a vehicle such as a truck, for example, a change speed gearing section 13, and an output coupling section 14 with an output shaft 16 which connects to the drive line of the vehicle. The invention will best be understood by first considering the general functions of each such section.

The gearing section 13 contains change speed gears 17 which may be coupled in a plurality of predetermined relationships to provide a number of speed ranges or drive ratios between the transmission input shaft 18 and the output 16. The input clutch section 12 and the output coupling section 14 operate to disconnect the gearing section 13 from the engine drive input 18 and output 16 respectively when a shift is to be made. At this time, the input clutch section 12 also operates to brake the gears 17 to a stop so that the shift may be made with the gears stationary thereby eliminating any need for synchronizing mechanisms. After the gears 17 have been recoupled to provide a changed speed range, the input clutch section 12 further operates to accelerate the gears 17 for recoupling into the power path with a changed drive ratio through the system. Concurrently with the decoupling of the gears 17 from the power path during a shift, the input clutch section 12 of this embodiment also functions to provide a direct driving connection from the input shaft 18 to the output 16 so that drive is continuously transmitted through the transmission during the shifting period. In a represenative embodiment of the invention, all of these operations are completed in less than one second.

Considering now the structural components of a typical embodiment of the invention, the transmission input shaft 18 connects to a flywheel 19 and an input clutch 21 couples the flywheel to a drive shaft 22 which extends into the gearing section 13. A spring 23, of the disc type in this example, bears against input clutch 21 through a piston 24 to hold the clutch engaged so that driving torque is normally transmitted to the gearing section 13 and ultimately to the transmission output 16 through the flywheel 19, cluch 21 and shaft 22. With the input clutch 21 engaged in this manner, there is effectively a solid mechanical drive through the transmission 11 at a specific drive ratio determined by the pattern of interconnection of the change speed gears 17.

To change speed ranges, the input clutch 21 must disengage to decouple the gearing section drive shaft 22 from the driving engine. This is accomplished by operator initiated movement of an actuator piston 26 which acts through a needle thrust bearing 27, friction disc 28 and a sleeve portion 29 of piston 24 to compress the spring 23 which holds the input clutch 21 in its engaged position. The mechanism through which the operator actuates piston 26 and initiates a shift may take a variety of forms including a conventional clutch pedal linkage and gear shift lever. However, the advantages of the invention may be more fully realized by utilizing power shift means which in this embodiment is a pneumatically operated shifting control system 31 which actuates piston 26 by applying air pressure thereto in response to the operator's movement of a shifting control lever 32 as will hereinafter be discussed in more detail.

To provide for continuous drive to the transmission output 16 during the interval in which gears 17 are disconnected from both the input 18 and the output 16, a throughdrive clutch 33 is engaged by the above described movement of actuator piston 26 to couple the fly-wheel 19 to a through shaft 34 which extends directly to the transmission output shaft 16. Thus, concurrent with the decoupling of the change speed gearing section 13 from the transmission input shaft 18 by input clutch 21, the output 16 is independently coupled to the input shaft 18.

In some transmission applications, the throughdrive clutch 33 may be omitted while still realizing many of the advantages of the invention. However, the continuous drive provided by the throughdrive clutch is highly desirable from the standpoint of utilizing engine power output during the shift transient and for restraining engine acceleration at such times.

In order to change the engagements of the gears 17 while the gears are in a stationary condition and thereby dispense with the need for synchronizers, means are provided for braking the gears to a stop during the initial period of the shift transient. Such means may be a brake 36 coupled between the stationary housing 37 of the transmission and the gearing section drive shaft 22. Brake 36 is positioned to be actuated, as input clutch 21 disengages, by a pneumatic piston 35 which is energized by control system 31 following operation of the clutch actuator piston 26. As all of the change speed gears 17 are always coupled directly or indirectly to the gearing section drive shaft 22 at the initiation of a shift, such action stops all such gears. A series of jaw clutches 38, 39 and 46 may then be shifted, as will hereinafter be described in greater detail, to provide for a changed speed ratio upon recoupling of the gearing section 13 into the power path. The movements of each of the jaw clutches 38, 39 and 46 to obtain a selected gear setting may be accomplished through an associated shifting fork 47 which is controlled by the operator's movement of the shifting lever 32 between the several positions thereof. While a variety of linkages or other mechanisms may be utilized to manipulate the shifting forks 47 in response to the movements of the shift control lever 32, it is advantageous to operate the forks 47 through the pneumatic system of the gear shifting control 31. In particular, each jaw clutch 38, 39 and 46 is moved axially to engage and disengage the associated gears by pneumatic actuators 42, 43 and 44, respectively. Each shifting fork 47 is attached to an actuator piston 48 slidable within a bore 49 in response to a force differential between the opposite ends of the piston. The appropriate pneumatic signals for each shift are generated by the shifting control 31, as will hereinafter be described.

To provide for the shift operations described above, it is also necessary that the gearing section 13 be decoupled from the transmission output 16 at the start of the shifting transient and that it be recoupled thereto at the completion of the shift. These function are performed by the output coupling section 14 which transmits drive from the output shaft 51 of the gearing section 13 to the transmission output 16. Output coupling section 14 has a first clutch mechanism 52 which couples the gearing section output shaft 51 to the transmission output 16 and as will hereinafter be described in greater detail, functions in the manner of a self-energizing overrunning clutch during the shift transient. Thus, the first clutch mechanism 52 can transmit torque to output 16 from the gearing section output 51 but cannot transmit torque in a reverse direction. Accordingly, at the start of the shifting transient, clutch 52 automatically disengages as the gearing section output shaft 51 is slowed relative to the transmission output 16 by the brake 36 of the input clutch section 12. Inasmuch as the transmission output 16 is concurrently coupled directly to the flywheel 19 through the action of throughdrive clutch 33, as hereinbefore described, there is little interruption of drive through the transmission as a whole although the gearing section 13 has been isolated so that the desired changes of gear settings may be made.

The unidirectional torque transmission of the first output clutch mechanism 52 is desirable during the shifting transient, but would be undesirable under nontransient conditions in the absence of further provisions in that the transmission 11 has reverse gear settings as well as forward speeds. Further, it is desirable that drag be exerted against the transmission output 16 under some reversed torque conditions such as when the associated vehicle is traveling down an incline with the engine at low throttle. Accordingly, output coupling section 14 includes a second output clutch mechanism 53 to provide a supplementary drive connection between the gearing section output shaft 51 and the transmission output 16 except during the shifting transient. The second output clutch 53 may be a normally engaged mechanical coupler mechanical coupler connected between the gearing section output 51 and the transmission output 16 and is of a type which can be temporarily disengaged during the shifting transient by the application of air pressure to a piston 54 by the shifting control system 31. Thus, the first output coupling clutch 52 is, in effect, bypassed by a positive mechanical coupling except during a shifting transient.

Following the decoupling and recoupling of the change speed gears 17, it is necessary that the above described sequence of operations be reversed. In particular, brake 36 must be released and the gearing section 17 must be recoupled to the transmission input 18 and output 16 while the through shaft 34 is simultaneously decoupled from the input. These operations are initiated by the release of air pressure, through the shifting control 31, from actuating pistons 35 and 26 at the clutch cluster 12 and from piston 54 at the output coupling section 14.

As the air pressure against clutch cluster piston 35 is relieved, brake 36 releases. Some initial acceleration of gearing section 13 then occurs through friction disc 28. As the air pressure against piston 26 is relieved, spring 23 acts through piston 24 to disengage the throughdrive clutch 33 and to engage the input clutch 21 thereby recoupling the gearing section 13 to the transmission input 18. The change speed gears 17 are accelerated and when the gearing section output shaft 51 reaches the angular velocity of the transmission output shaft 16, the overrunning clutch mechanism 52 in the output coupling section 14 engages to restore the non-transient power path through the transmission 11. Following reengagement of the first output clutch 52, the air pressure against actuator piston 54 is relieved through the shifting control 31 to reengage the positive drive output clutch 53. This completes the shifting transient with drive being again transmitted through the gearing section 13 at a changed ratio.

Since the change speed gears 17 are stopped during a shift and must be accelerated very rapidly for recoupling into the power path, the input clutch 21 should preferably have a capacity which is coordinated with the torque at input 18 to provide a smooth transition. This condition cannot always be met by establishing a fixed clutch capacity inasmuch as the torque output of most engines varies with engine speed and transmission shifts may be made at various throttle settings. Thus, to avoid abrupt shock loads, while minimizing the time required for acceleration of the gearing section 13, different input clutch capacities may be needed for successive shifts. Accordingly, the invention provides means which automatically varies the capacity of the input clutch 21 as a function of the speed of the transmission input shaft 18.

An annular fluid filled capacity modifying chamber 56 is formed between the radially outermost portion 57 of piston 24 and an inwardly extending annular member 58 carried by flywheel 19. A volume of liquid 59, which may be transmission lubricating oil, is situated in chamber 56 and is trapped therein by centrifugal force which also produces a fluid pressure tending to move the piston 24 against the action of spring 23, with the pressure being a function of the input shaft speed. The capacity of input clutch 21 is therefore determined by the force which spring 23 exerts thereon as modified by the counteracting variable force exerted by the rotating fluid volume 59. Thus, the effect of the fluid pressure within chamber 58 is to progressively reduce the input clutch capacity as the speed of the transmission input shaft 18 increases.

Figures 2, 7, 8:
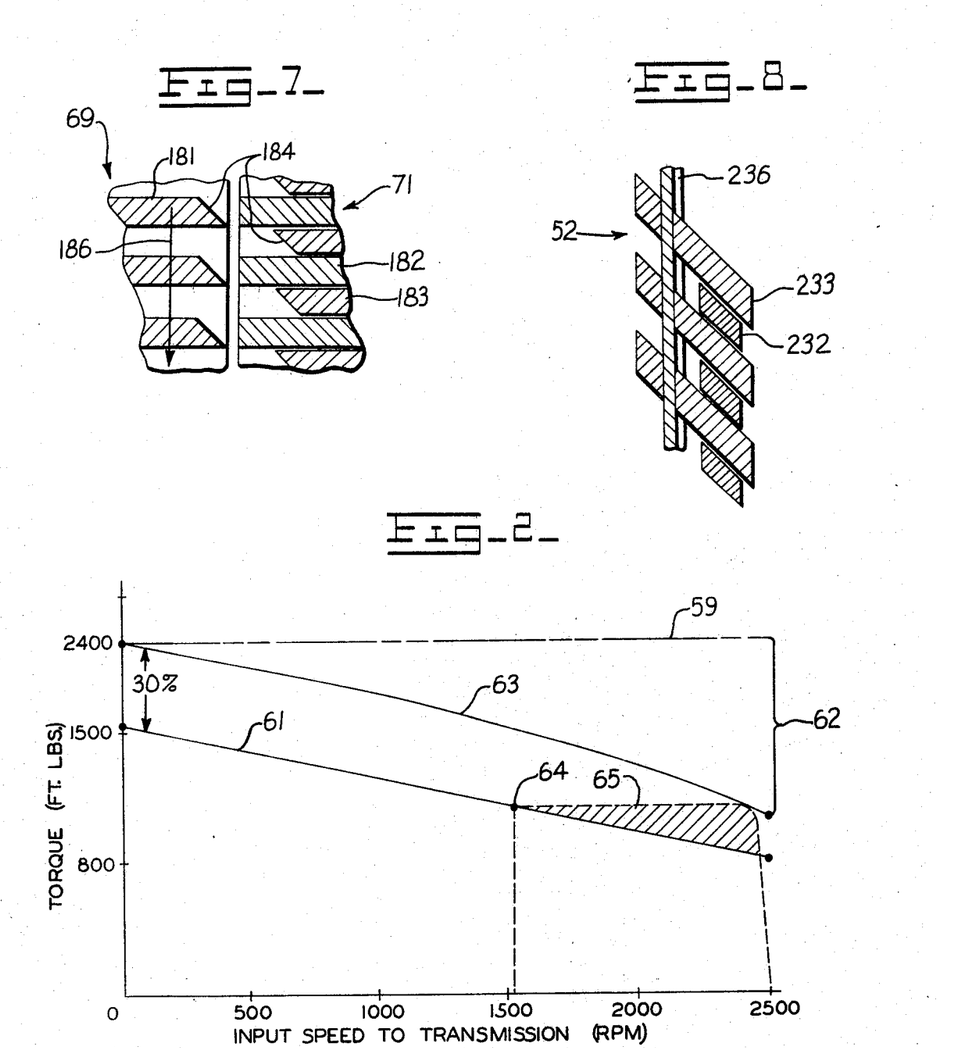
FIG. 2 is a graph showing clutch capacities as a function of speed in clutch mechanisms within the transmission of FIG. 1.
FIG. 7 is a section view taken along line VII—VII of FIG. 6B showing the configuration of the teeth of a gear coupling mechanism therein.
FIG. 8 is a section view taken along line VIII—VIII of FIG. 6C showing the tooth configuration of elements of a clutch mechanism thereof.

If there were no provision for modification, the capacity of input clutch 21 would be essentially constant, as illustrated graphically by dashed line 59 in FIG. 2, as a result of the relatively constant loading provided by spring 23. In FIG. 2, torques are plotted against transmission input speed with typical values being given for a representative example of the invention. In contrast to the fixed clutch capacity indicated by line 59, the torque output of most engines which may be coupled to the transmission will vary as a function of speed as indicated by solid line 61. The form of the curve 61 of input torque variation with speed will differ for different engines. The curve 61 as shown in FIG. 2 is typical of a gas turbine engine wherein output torque decreases linearly as engine speed increases. A representative engine of this class may produce an output torque of about 1630 ft.-lbs. at stall and a torque of about 815 ft.-lbs. at a maximum speed of 2500 r.p.m. Under most circumstances, most efficient transmission operation is obtained where the input clutch capacity exceeds the input torque by a factor of about 30%. Thus, in this example, the input clutch capacity would, ideally, vary linearly from about 2120 ft.-lbs. at stall to about 1060 ft.-lbs. at 2500 r.p.m. This relationship is approximated, as shown by solid line 63 in FIG. 2, by the hereinbefore described capacity modifying effect of the fluid chamber 56 at the input clutch 21. The excessive clutch capacity which would be present as engine speed increases, in the absence of compensation, as shown by bracket 62 for example, is eliminated.

As discussed above, the present example of the invention is designed for use with gas turbine engines which have output torques that decrease with speed as indicated by curve 61. The capacity compensating means can be modified as necessary to accommodate to other forms of input torque curve. Most piston engines, for example, have a torque output which increases with speed; and in such applications, the capacity compensation is arranged to exert a variable force on the input clutch 21 which supplements, rather than counteracts, the force of spring 23. This may be done, for example, by situating the fluid volume 59 on the opposite side of piston 24.

The throughdrive clutch 33 may have a capacity which is constant and fixed at the transmission shift or match point, indicated at 64 in FIG. 2. Under this condition, throughdrive clutch 33 exerts a desirable speed controlling effect on the driving engine during a shift in that the clutch may slip or engage solidly depending on the relationship of the speeds of input shaft 18, output 16 and the predetermined clutch capacity. At speeds greater than that of the match point 64, the throughdrive clutch capacity 65 exceeds the output torque of the driving engine and therefore slips to pull the engine speed down during the shift. Thus, during a shift transient, the engine speed tends to be pulled towards the speed which is optimum for the reconnection of the gearing section to the wheel drive line.

In order for the throughdrive clutch 33 to have the constant capacity for functioning in the manner described above, means must be provided for eliminating the variable effect of the capacity modifying chamber 56 inasmuch as the piston 24 of the modifying chamber is coupled to one side of the throughdrive clutch. For this purpose, the piston 24 contacts a stop 66 on flywheel 19 after the piston 24 has moved a distance sufficient to disengage input clutch 21 so that the pressure against the throughdrive clutch is then determined solely by the fixed force of spring 23.

A highly advantageous feature of this form of transmission is that a unique arrangement of change speed gearing may be employed which is extremely compact and simple while providing for a relatively large number of speed ranges. Referring again to FIG. 1 in particular, a gearing section 13 is shown which provides for four forward speeds and two reverse speed power paths, other numbers of speed ranges being readily provided for as will hereinafter be described.

The four speed gearing section of FIG. 1 has change speed gears 17 disposed on an upper or principal shaft which is an extension of output shaft 51 and a lower countershaft 68 which is parallel thereto, the upper shaft being co-axial with transmission input shaft 22 and through shaft 34 and being of a diameter intermediate therebetween. Three such gears 69, 71 and 72 are carried on the upper shaft 51 in spaced apart relationship with each being freely rotatable relative to the shaft and being of progressively increased diameters. An additional three gears 73, 74 and 76 are disposed on the lower shaft 68 in permanent engagement with gears 69, 71 and 72, respectively, of the upper shaft. Gear 73 is freely rotatable relative to the lower shaft 68, while gears 74 and 76 are fixed thereto.

The torque input to the gearing section 13 is the previously described transmission drive shaft 22 which carries and turns gear 69. The upper shaft 51 drives a hub 77 which operates one side of the overrunning clutch mechanism 52 and solid drive clutch 53 of the output coupling section 14. Thus, upper shaft 51 constitutes the torque output element of the gearing section 13. The output shaft 51 is itself driven by either gear 71 or 72 according to the setting of the associated jaw clutch 38 which has two positions each coupling one of the gears 71 or 72 to the output shaft. A second jaw clutch 39 coaxial with output shaft 51 has a first position coupling gears 69 and 71 and a second position at which the two gears are disengaged. The third jaw clutch 46 is at countershaft 68 and selectively engages gears 73 and 74. By appropriately positioning the three jaw clutches 38, 39 and 46, the four different forward drive ratios through the gearing section 13 may be realized, this being the total number of theoretically possible forward power paths through the system.

Thus, gear 73 may be engaged with gear 74 while gear 72 is engaged with output shaft 51 to provide a first forward speed. By engaging gears 69 and 71 while gear 72 is engaged with output shaft 51, a second forward speed is obtained; while a third speed range results from engaging gears 73 and 74 while coupling gear 71 to the output shaft. The fourth forward speed range is obtained by engaging gears 69 and 71 while coupling gear 71 to the output shaft 51 thereby effecting a one to one drive ratio through the gearing section 13 of the transmission. A neutral position is effected by disengaging gears 69 and 71 and concurrently disengaging gears 73 and 74.

To provide for the two reverse speed ranges in this embodiment of the invention, a first compound gear 78 is engaged with gear 73 of countershaft 68 and engages with a second compound gear 79. An additional gear 81 is carried on countershaft 68 by a spline connection 82 and may be moved axially, by air pressure from shifting control 31 acting on an actuator cylinder 83, to couple gear 79 to countershaft 68 when a reverse gear setting is desired. With the axially movable gear driving countershaft 68 from gear 79 in this manner, a different reverse speed range is obtained at each of the two positions of the jaw clutch 38 between gears 71 and 72.

It is a further characteristic of the invention that the number of speed ranges provided by the transmission 11 may readily be increased with a minimum of complication and a minimal increase in size. For each added set of two gears, the number of available speed ranges may be doubled. Thus, an eight, sixteen or thirty-two speed range unit may be provided by the addition of one, two or three pairs of gears, respectively.

Figure 3:
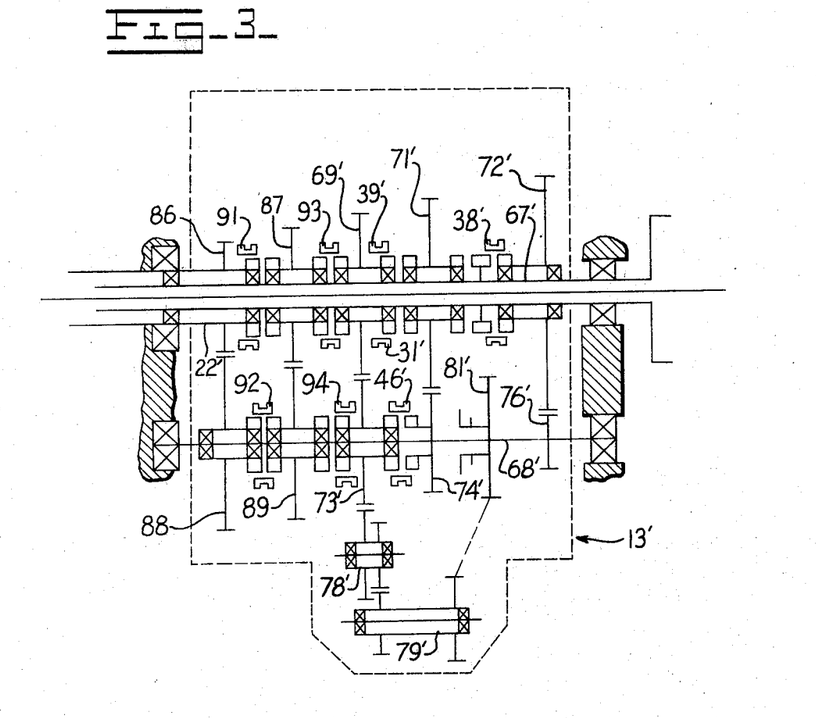
FIG. 3 is a schematic view of a modified change speed gear section for the transmission of FIG. 1 wherein sixteen forward speeds, rather than four forward speeds, are available.
Figure 4:
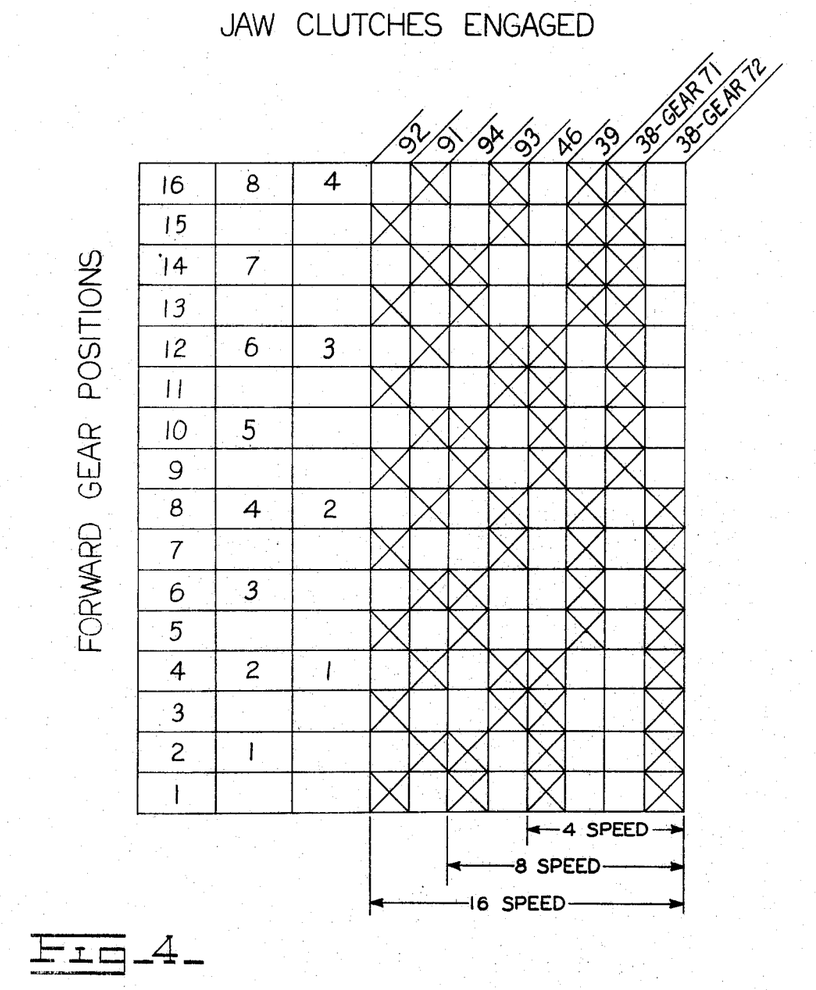
FIG. 4 is a chart showing clutch engagements for obtaining the forward speed settings in the transmission of FIGS. 1 and 3.

Referring now to FIG. 3, a modified change speed gear section 13' of this type is shown having four additional gears 86, 87, 88 and 89. Additional gears 86 and 87 are situated on the input shaft 22' with gear 86 being solidly coupled to the input and with gear 87 being freely rotatable thereon. The other additional gears 88 and 89 are carried on the countershaft 68' and are both rotatable thereon. An additional jaw clutch 91 provides for the selective coupling of gears 86 and 87, while another jaw clutch 92 provides for selective coupling of gears 88 and 89 on countershaft 68'. Gear 86 engages gear 88, while gear 87 engages gear 89. The remaining elements of the modified change speed gearing section 13' may be similar to those previously described with respect to the embodiment of FIG. 1 and thus include gears 71', 72', 73' and 74' as well as reverse gearing 78', 79' and 81'. An analysis of the different power paths obtainable by varied settings of the jaw clutches 91 and 92, 39', 38', 46' as well as an additional jaw clutch 93 for selectively coupling gears 87 and 69' and still another jaw clutch 94 for selectively coupling gears 89 and 73' is shown in chart form in FIG. 4. An indicated therein, eight forward speeds and four reverse speeds may be realized when only two of the additional gears, 87 and 89, are provided; and with the four additional gears, 86 to 89, sixteen forward speeds and eight reverse speeds may be realized.

The change speed gear arrangements described above differ from those of prior mechanical transmissions in that the gears are bearing mounted on the associated shafts, aside from input and output gears at the ends of the power paths, and jaw clutch connections are made from gear to gear rather than from gear to shaft. With this arrangement corresponding jaw clutches at the principal shaft and countershaft, e.g. jaw clutches 39 and 46, are engaged alternately to realize different speed ratios through the system. If jaw clutch 39 is engaged, for example, jaw clutch 46 is disengaged. Using such a system, the maximum number of different forward drive ratios obtainable can be expressed by the relationship:

$$R_n = 2^{(G-1)}$$

where $R_n$ is the maximum number of drive ratios and G is the number of sets (pairs) of change speed gears.

Figure 5:
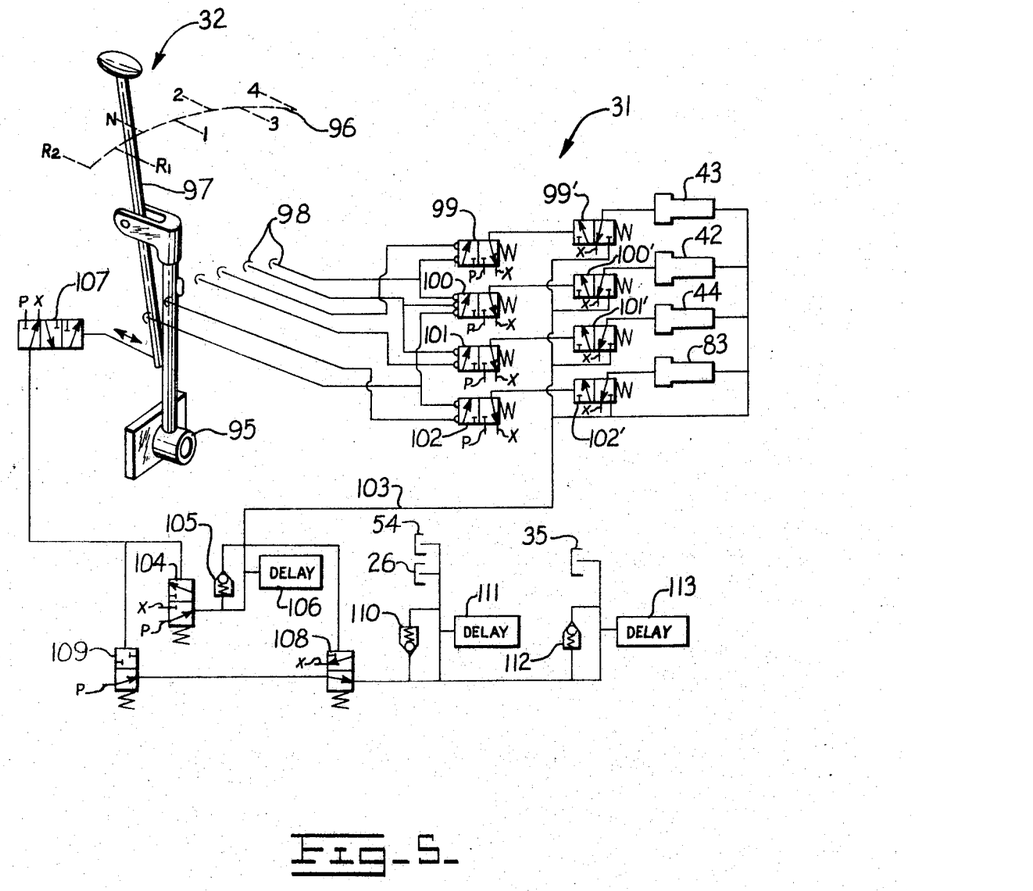
FIG. 5 is a schematic diagram of suitable pneumatic control circuitry for the transmission of FIG. 1.

Referring now to FIG. 5, a suitable pneumatic control system 31 for the four-speed transmission as shown in FIG. 1 may have the control lever 32 pivoted at the lower end 95 for fore and aft movement between gear settings as indicated by dashed arc 96. The upper end 97 of the control lever 32 may be pivoted to the lower section 95 thereof for limited motion in a transverse direction at each of the gear settings along arc 96, the several transverse slots corresponding to gear settings being alternated on opposite sides of the arc. At each position along arc 96, which corresponds to a gear setting, control lever 32 depresses cam means 98, which in turn actuate selected ones of a series of pilot valves 99, 100, 101, and 102, which operate shifting fork actuator power valves 99', 100', 101', and 102', respectively. Each power valve 99', 100', 101', and 102', when operated, opens the large area end of the associated shifting fork actuator 43, 42, 44 or 83, respectively, to a high pressure air supply line 103. In the unoperated position, each power valve 99' to 102' vents the large end of the associated actuator. The small area ends of the actuators 42, 43, 44 and 83 are each directly connected to supply line 103.

To provide for the specific gear settings as hereinbefore described, lever 32 and cams 98 are arranged to actuate pilot valve 101 at the first forward speed setting of the lever and to actuate pilot valve 99 at the second forward speed position. At the third forward speed setting, both of pilot valves 100 and 101 are actuated; while at the fourth forward speed setting, both of valves 99 and 100 are actuated. At the neutral position of the control lever 32, none of the several pilot valves are actuated; while at the first reverse gear setting, only pilot valve 102 is actuated. At the second reverse gear setting, both of valves 100 and 102 are actuated.

Actuation of any one of the pilot valves 99 to 102 operates the associated power valve 99' to 102' from a position at which the large end of the associated actuator 43, 42, 44 or 83 is exhausted to a position at which the associated actuator is ready to receive air pressure through the supply line 103. Such actuation of any of the pilot valves 99 to 102 by depression of the associated cam means 98 by lever 32 does not, in and of itself, cause air pressure to be admitted to the associated actuator cylinder inasmuch as a valve 104 blocks the flow of air pressure into line 103 when lever 32 is in arc 96 and valve 107 has operated valve 104. Thus, the control lever 32 may be moved along arc 96 to make multiple step shifts, if desired, without shifting into the intermediate speeds.

The admission of air pressure to supply line 103 to initiate a shift is controlled by the valve 104 which applies the pressure to line 103 through a delay means 106 when the shift lever 32 is moved transversely with respect to arc 96 into one of the gear setting slots. When the shift lever 32 is at arc 96, valve 104 exhausts the supply line 103, and thus both ends of all actuators 43, 42, 44 and 83 in preparation for the shift. To facilitate the exhausting of line 103, delay means 106 is bypassed by a check valve 105. To control the valve 104 in this manner, a three-position valve 107 is actuated by the transverse movement of the control lever 32 relative to arc 96. When control lever 32 is moved to arc 96, valve 107 supplies air pressure to valve 104 to pilot such valve to the position at which supply line 103 is exhausted in preparation for a shift. When the control lever 32 is moved transversely into a new gear setting notch, the shift is initiated as valve 107 removes the pilot pressure from valve 104 causing air pressure to be readmitted to the actuator supply line 103 through the delay means 106. Delay means 106 prevents immediate shifting of the several actuators, 43 42, 44, and 83, to provide time for the decoupling of the transmission change speed gears from the transmission input and output, and for braking of the change speed gears, as hereinbefore described.

To operate the throughdrive clutch and input clutch actuator piston 26, output coupling actuator piston 54 and brake actuator piston 35 at the initiation of the shift with the previously discussed time sequencing, each of the actuator pistons is pressurized with air supplied through an additional valve 108. Valve 108 is piloted by the pressure within actuator supply line 103 so that the clutch and brake pistons 26, 35 and 54 are exhausted when the supply line is pressurized while the pistons are connected to still another valve 109 when the pressure in the supply line is exhausted. Valve 109 is in turn piloted by the previously described valve 107 so that high pressure is supplied to valve 108 when the shift lever 32 is moved transversely into a gear position notch and valve 109 is closed when the shift lever is centered at arc 96.

To provide the proper sequencing for operation of the pistons, 26, 35, and 54, both of pistons 26 and 54 are connected to the valve 108 through a check valve 110 providing for rapid pressurization of the clutch pistons through valve 108. A delay 111 bypasses the check valve 110 to slow the exhaust of the two pistons 26 and 54, following opening of valve 108, until after exhausting of the brake actuator piston 35. The brake actuator piston 35 is coupled to the valve 108 through an opposite arrangement which includes a check valve 112 providing for rapid exhausting of the brake piston upon opening of valve 108. The check valve 112 is bypassed by an additional delay means 113 which slows energization of the brake actuator piston 35, relative to energization of the input and output clutch pistons 26 and 54.

Thus, the several delay means 106, 111 and 113 are selected to sequence actuation of the associated elements so that following exhaust of the actuator supply line 103 and the subsequent repressurization thereof, clutch actuator pistons 26 and 54 are energized first, followed by energization of the brake piston 35, and subsequently by energization of the several actuators 43, 42, 44 and 83. Due to the several check valves 105, 110 and 112, which bypass each of the delay means 106, 111 and 113, respectively, the sequencing at the completion of the shift is de-energization of the brake piston 35 followed by de-energization of clutch actuator pistons 26 and 54, while the pneumatic actuators 43, 42, 44 and 83 remain energized.

Thus, summarizing the operation of the shift control 31, transverse movement of the control lever 32 out of a specific gear setting to its central position along arc 96 actuates valve 107 to apply a pressure signal to valve 104 which then vents both ends of the several pneumatic actuators 43, 42, 44 and 83. Such movement also readies valve 108 to supply pressure to the clutch and brake actuator pistons 26, 35 and 54; however, such pistons are not actuated at this time inasmuch as valve 109 concurrently closes to block high pressure therefrom. Subsequent movement of the control lever 32 along arc 96 to a selected new gear setting position changes the settings of the several pilot valves 99 to 102 so that the selected new gear setting will be brought about by the actuators 43, 42, 44 and 83 upon re-energization thereof. The actual shift is then initiated when the control lever 32 is moved transversely into the selected gear setting notch, at which time valve 107 is moved to a position at which valves 104 and 109 are again de-energized. The de-energization of valves 104 and 109 initiates the repressurization of the actuator cylinders 43, 42, 44 and 83 through supply line 103; and energization of the clutch and brake systems 26, 35 and 54 through the valve 109 with the delay means 106, 111 and 113 providing required sequencing as hereinbefore described. When the actuators 43, 42, 44 and 83 have been fully re-energized, valve 108 is piloted thereby to exhaust the clutch actuator pistons 26 and 54 and brake actuator piston 35 with the reversed sequencing as described above. The system is thereby restored to the initial condition, except insofar as the changed gear setting has been obtained.

Considering now a suitable detailed physical construction for the transmission shown schematically in FIG. 1, it should be understood that the mechanism may take a variety of forms while still embodying basic components described above and while providing the described operational advantages in a very compact unit. FIGS. 6, 6A, 6B and 6C show a particularly advantageous physical arrangement for the structure as designed to function as a four-speed transmission for a truck vehicle powered by a gas turbine engine.

Figure 6A:
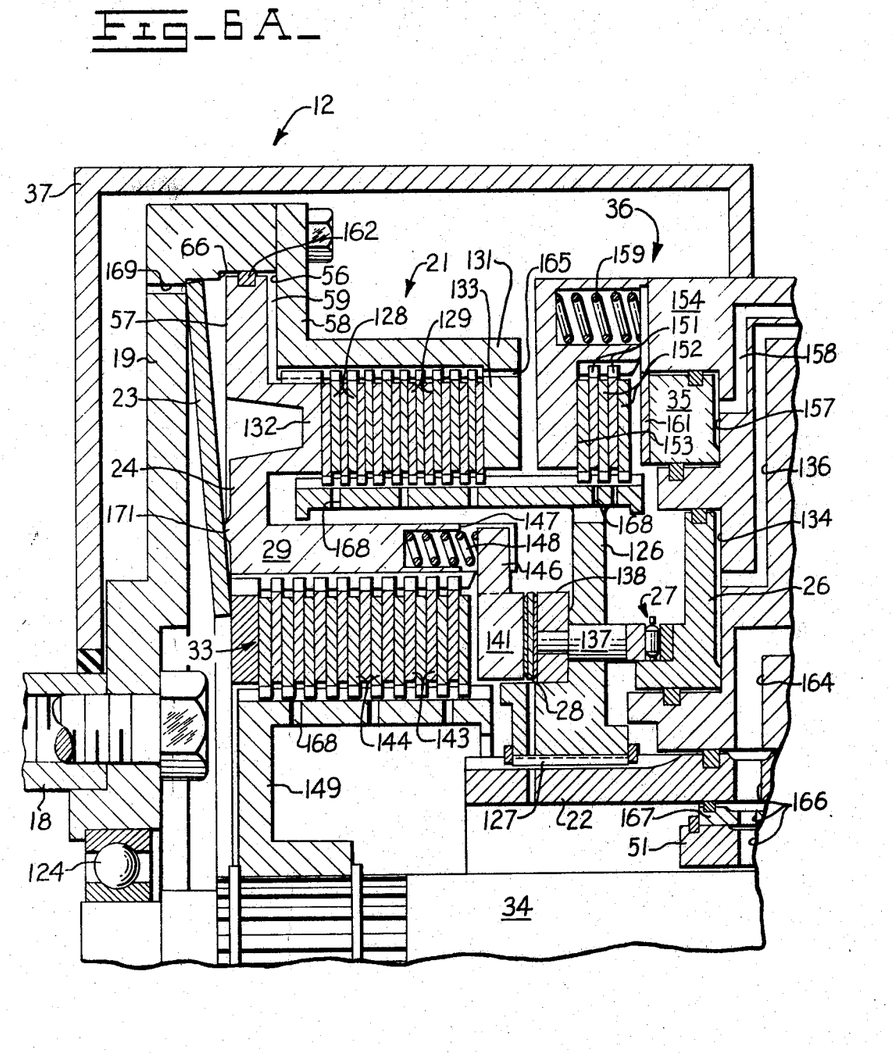
FIGS. 6A to 6C are enlarged axial section views of the regions of the transmission of FIG. 6 enclosed by dashed lines 6A to 6C thereon showing details of the internal elements of the transmission.
Figure 6B:
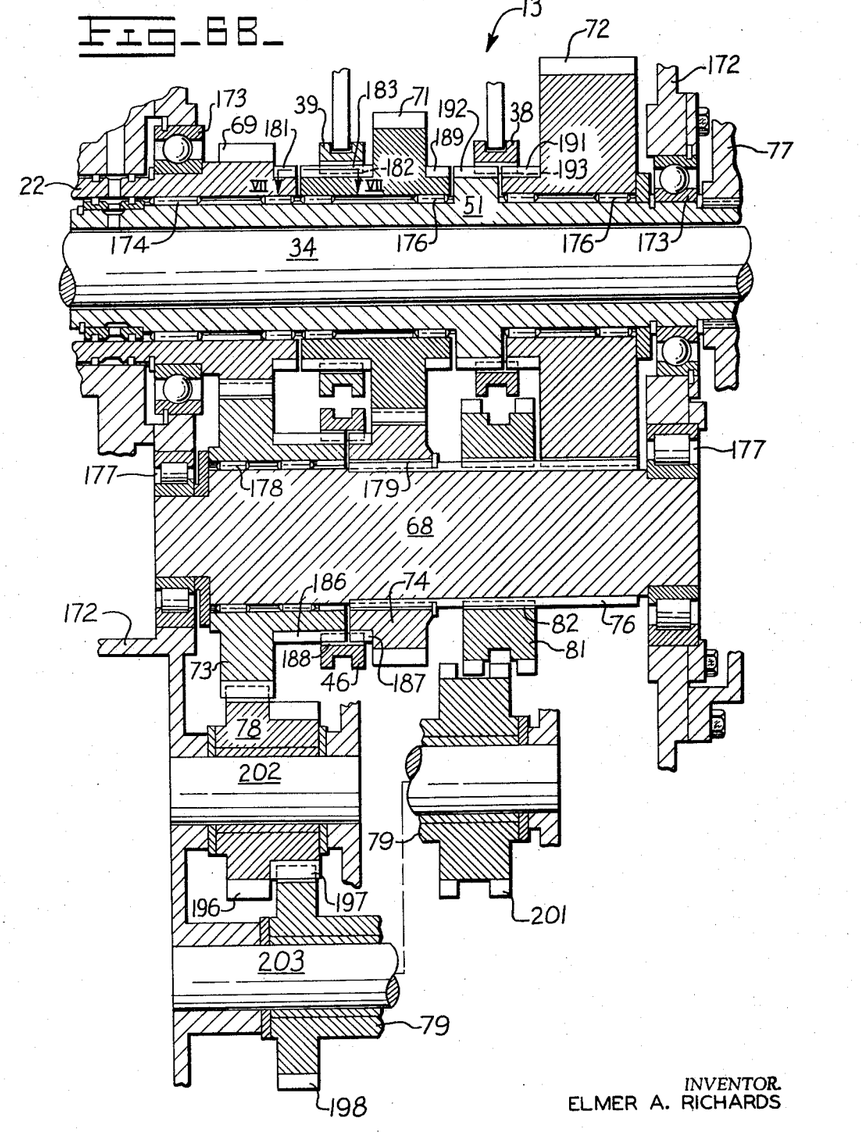
Figure 6C:
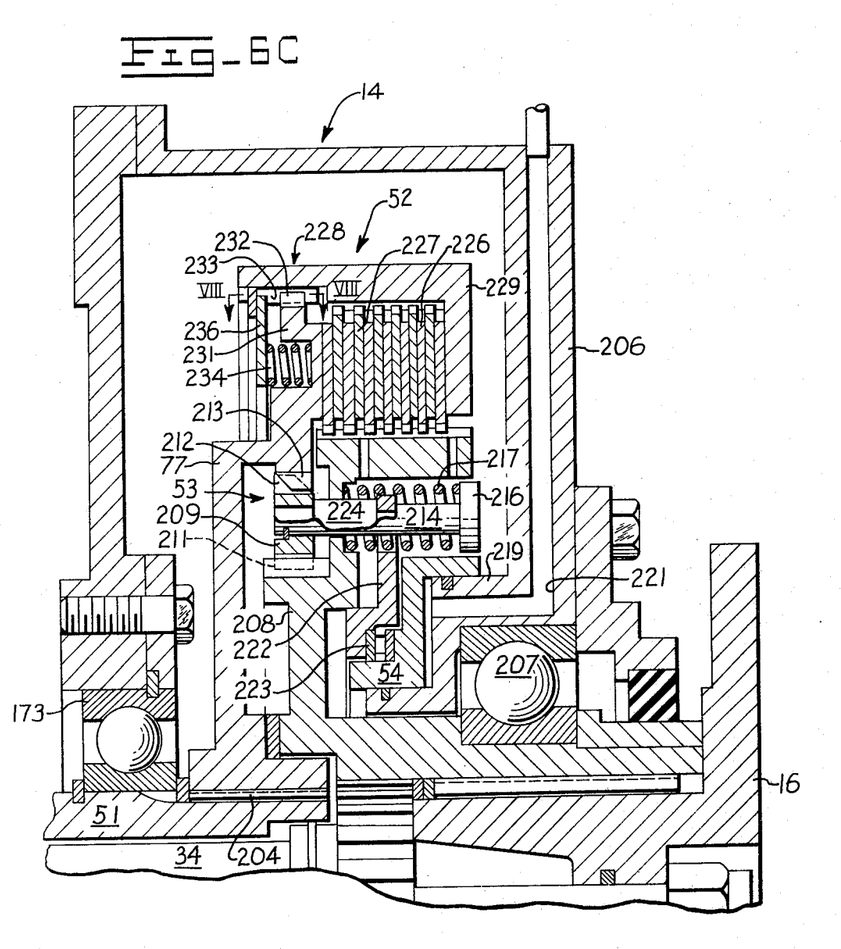

FIGS. 6A, 6B and 6C are side elevation section views of the portions of the transmission 11 enclosed by the correspondingly identified dashed lines in FIG. 6, and illustrate detailed structure for elements of the input clutch cluster section 12, change speed gearing section 13, and output coupling section 14, respectively.

Considering first suitable structural components for the input clutch cluster section 12, with reference to FIG. 6A, flywheel 19 may be situated at the forward end of the transmission housing 37 and is coupled to the transmission input shaft 18 for rotation therewith. A ball bearing 124 in the flywheel supports the front end of through shaft 34. The gearing section drive shaft 22 is also coaxial with through shaft 34 and rotatable thereabout and extends a distance into the rearward end of the clutch cluster section 12, but terminates in spaced relation from the flywheel 19. Drive is transmitted from the flywheel 19 to gearing section drive shaft 22, under non-transient conditions, through the input clutch 21 and an annular hub 126 disposed coaxially at the end of the shaft 22 and coupled thereto by a spline connection 127. Input clutch 21 has a series of annular clutch plates 128 alternated with discs 129 which are coaxial with hub 126 and with an annular member 131 secured to the flywheel 19. Plates 128 are splined to member 131 while discs 129 are splined to hub 126 so that drive is transmitted therebetween upon the application of sufficient axial pressure to the series of plates and discs.

The spring 23 which holds the input clutch engaged may be of the Belleville type and is disposed adjacent the rearward side of the flywheel 19 in contact therewith. Spring 23 bears against axially movable piston 24 which is also coaxial with the flywheel and which has an annular boss 132 positioned to bear against the adjacent end of plates 128 and discs 129 of the input clutch 21. Clutch member 131 has an inwardly extending portion 133 at the opposite end of the series of plates 128 and discs 129 so that spring 23, acting through piston 24, tends to compress the plates and discs to maintain a driving connection between flywheel 19 and gearing section drive shaft 22.

The annular actuator piston 26, which compresses spring 23 to disengage the input clutch 21 at the start of a shift transient, is disposed in a conforming recess 134 in the rear wall of the clutch cluster section 12 and is moved in the direction of flywheel 19 to initiate a shift by the admission of high pressure into the recess through a passage 136. A series of pins 137 transpierce hub 126 and connect with an annular plate 138 to transmit the movement of actuator piston 26 to an annular friction disc 28 which in turn bears against an annular driven member 141. Inasmuch as pins 137, plate 138, friction disc 28, and member 141 are all rotatable while the actuator piston 26 is fixed against rotation, a needle thrust bearing 27 is situated between the actuator piston and pins 137. The several parts are proportioned so that when the piston 26 is in its retracted or unactuated position, member 141 is spaced a small distance from the rearward end of a second series of coaxial annular alternated plates 143 and discs 144, which form the throughdrive clutch 33. Member 141 is constrained to turn with the sleeve 29 of piston 24 by radial arms 146 which extend into slots 147 on the sleeve. To maintain a light load on needle bearing 27 at all times, which is desirable to reduce wear, and to aid separation of the discs and plates of the throughdrive clutch 33, compression springs 148 are disposed in slots 147 and act against the arms 146 of member 141.

The plates 143 of throughdrive clutch 33 are splined to sleeve 29, while discs 144 are splined to a hub 149 which drives the through shaft 34. Thus, when the above described movement of actuator piston 26 causes member 141 to exert pressure against clutch plates 143 and discs 144, the throughdrive clutch engages to couple through shaft 34 to flywheel 19. Under this condition, the force acting on plates 143 and discs 144, and thus the capacity of clutch 33, is primarily determined by spring 23 which yields in response to such movement. As throughdrive clutch 33 is engaging in this manner, the compression of spring 23 is also relieving the force acting against input clutch 21 through piston boss 132, thereby disengaging the input clutch 21 and decoupling the gearing section drive shaft 22 from the flywheel 19.

The brake 36 which functions to stop the gearing section drive shaft 22 is comprised of an additional series of alternated annular plates 151 and discs 152 disposed coaxially with respect to hub 126 and rearwardly from the input clutch 21 within an annular recess 153 formed in a transmisison housing member 154. Discs 152 are spline connected to the hub 126, while plates 151 are splined to stationary housing member 154; and the annular brake actuator piston 35 is positioned in a recess 157 to bear against the plate and disc assembly upon the application of high pressure air to the piston through a passage 158 in housing member 154. In the absence of air pressure, actuator piston 35 is held in its retracted position by a series of compression springs 159 which act against an annular plate 161 that extends across the face of the piston.

The fluid chamber 56 which varies the capacity of the input clutch 21 in response to input speed is defined by the flange 57 of piston 24, which carries a seal 162 adjacent the inner surface of the flywheel 19, and by flange 58 of input clutch member 131 which is secured to the flywheel. The oil volume 59 which is trapped in chamber 56 by centrifugal force is derived from the transmission lubricating oil supplied to the region within the end of gearing section input shaft 22 through a passage 164 in transmission housing section 154 and radial passages 166 in the shaft 22 and shaft 51 and through an oil seal 167 situated therebetween. Oil in this region acquires the rotary motion of the adjacent structural elements and is thus impelled outwardly by centrifugal force where a portion of the oil is ultimately trapped in the chamber 56. A passage 165 in member 131 determines the radial dimension of the oil volume trapped within chamber 56. Radial passages 168 transmit lubricating oil outwardly and are situated in hubs 126 and 149 in locations which direct the oil flow against the sides of the plates and discs of input clutch 21, throughdrive clutch 33 and brake 36. As the input clutch capacity modifying effects of the fluid volume trapped in chamber 56 are dependent upon the axial force exerted against the adjacent piston flange 57, it is important to insure that no similar volume of oil is trapped on the opposite side of the flange. Accordingly, a series of axially directed passages 169 in the flywheel 19 provide for the release of any oil which may reach this region.

To prevent the oil volume 56 from modifying the capacity of throughdrive clutch 33 while drive is being transmitted therethrough to the through shaft 34, the stop 66 on flywheel 19 is positioned to be contacted by piston flange 57 after the piston 24 has moved sufficiently to disengage input clutch 21. At this position, spring 23 has been deflected away from piston 24 and exerts its full force against the throughdrive clutch 33 to provide the predetermined fixed clutch capacity.

The initial retraction of actuating pistons 26 and 35 to complete a shift releases the brake 36 and initiates acceleration of the gearing section drive shaft 22. The initial acceleration results in that substantially the full force of spring 23 is exerted against friction disc 28 at this time, causing the initial rotary motion of member 141 to be transmitted to hub 126, and thus to the shaft 22 when brake 36 releases. Further retraction of the actuator piston 26 causes spring 23 to contact a protuberance 171 on piston 24 so that the spring force is then exerted against the piston to reengage the input clutch 21. Reengagement of input clutch 21 completes the acceleration of the gearing section input shaft 22. Inasmuch as the spring pressure against throughdrive clutch 33 is relieved following the contact of spring 23 with protuberance 171, the throughdrive clutch disengages and drive is again transmitted to gearing section drive shaft 22 through the input clutch 21.

Referring now to FIG. 6B, through shaft 34 extends completely through the gearing section 13 within the gearing section output shaft 51 which is journalled to the front and rear walls of the gearing section housing 172 by ball bearings 173. Gearing section drive shaft 22, which has input gear 69 formed integrally thereon, extends a short distance into the forward end of the gearing section in coaxial relationship to output shaft 51 and is rotatable thereabout on needle bearings 174. Gears 71 and 72 are also carried on output shaft 51 and are rotatable thereabout on additional needle bearings 176. Countershaft 68 extends between bearings 177 at the front and rear walls of the gearing section housing 172 below shaft 51 and in parallel relationship thereto. Gear 73, which is permanently engaged with gear 69, is carried on the forward end of countershaft 68 and is rotatable thereabout on needle bearings 178. Gear 74, which permanently engages gear 71, is also carried on countershaft 68 and is constrained to rotate therewith by splines 179. Gear 76, which permanently engages gear 72, is formed integrally on the countershaft 68.

Coupler teeth 181 and 182 are provided on the adjacent ends of gears 69 and 71, respectively, to provide for selective engagement of the two gears by means of jaw clutch 39 which has internal teeth 183. Jaw clutch 39 may be moved axially as hereinbefore described to span the two sets of teeth 181 and 182 and thereby engage the gears and alternately may be moved completely onto teeth 182 as shown in FIG. 6B to disengage the gears.

Since engagement of gears 69 and 71 to obtain certain ratios is initiated after braking the gears to a stop, the coupler teeth 181 and 182 thereof may be out of alignment so that the internal teeth 183 of clutch collar 39 are blocked from engaging with teeth 181 at such time. However, engagement occurs immediately when re-acceleration of the gearing section 13 is initiated inasmuch as a very small amount of initial turning of gear 69 brings the teeth 181 and 182 into alignment and the hereinbefore described pneumatic shifting control continues to apply axial pressure to the clutch collar 39 at such time. To facilitate engagement in this manner, both coupler teeth 181 of gear 69 and internal teeth 183 of clutch collar 39 have adjacent end surfaces 184 which are oblique relative to the axis of rotation as shown in FIG. 7, with the surfaces 184 slanting away from the direction of movement of gear 69 as indicated by arrow 186.

Referring again to FIG. 6B, gears 73 and 74 also have coupling teeth 186 and 187, respectively, at adjacent ends so that jaw clutch collar 46, having internal teeth 188, may be moved axially to engage the two gears. To facilitate the gear engagement, teeth 187 of gear 74 and teeth 188 of clutch collar 46 preferably have the beveled end configuration as hereinbefore described with respect to teeth 181 and 183 of gear 69 and clutch collar 39, respectively, except insofar as the bevels are reversed to accommodate to the oppositely directed angular motion.

Inasmuch as the gearing section output shaft 51 may be driven either by gear 71 or gear 72 depending on the selected speed range, gears 71 and 72 have coupling teeth 189 and 191, respectively, which are spaced apart; and coupling teeth 192 of the output shaft are situated therebetween. Thus, the associated jaw clutch collar 38, which has internal teeth 193, may be shifted to engage either of gears 71 and 72 with the output shaft 51. It is again preferable that the teeth 189, 191 and 193 have the oblique end configuration, as hereinbefore described, to facilitate engagement.

Arrangements for reverse gear settings include the first compound gear 78 having a first set of teeth 196 permanently engaged with gear 73 and having a second set of teeth 197 of lesser pitch diameter engaging a first set of teeth 198 of the second compound gear 79. Gear 79 in turn has a second set of teeth 201 which may be selectively engaged or disengaged with gear 81 which is splined to countershaft 68 and which is movable thereon in an axial direction, as hereinbefore described, to shift the transmission into reverse gear.

Compound gears 78 and 79 are carried on separate shafts 202 and 203, respectively, which are mounted in the gearing section housing 172 in parallel relationship to shafts 34, 51 and 68. For maximum compactness, the shafts 202 and 203 and associated gears 78 and 79 may be situated to one side of the central vertical plane of the gearing section 13; but are shown in FIG. 6B as rotated around to a position directly below countershaft 68 in order to better illustrate the structure.

Referring now to FIG. 6C, the gearing section output shaft 51 extends a small distance rearwardly from bearing 173 into the output coupling section 14. Within output coupling section 14, the input hub 77 of overrunning clutch 52 is carried on the end of the shaft 51 by a spline connection 204 which constrains the hub to turn with the shaft. Through shaft 34 extends further into the output coupling section 14 and connects to the transmission output 16 which is journalled within the rear wall of the output coupling section housing 206 by a bearing 207 and which may be connected to the drive line of a vehicle in any of various ways well known to the art.

Under non-transient conditions, drive is transmitted from the gearing section output shaft 51 to the transmission output 16 through the solid drive clutch mechanism 53 as hereinbefore described. Clutch 53 is situated between hub 77 and a sleeve 208 which is disposed coaxially with respect to the output 16 and turns therewith. Clutch 53 has an axially movable ring 209 having a spline connection 211 to sleeve 208. Ring 209 has external teeth 212 which engage internal teeth 213 of hub 77 to couple output 16 therewith when the ring is moved rearwardly, while forward movement of the ring disengages the teeth 212 and 213. To hold the ring 209 in a normally engaged condition, a series of pins 214 extend rearwardly therefrom through sleeve 208 and have enlarged heads 216 with a compression spring 217 being disposed coaxially around each pin between the head thereof and the sleeve. Thus, the clutch 53 normally provides a solid drive connection between the gearing section output shaft 51 and the transmission output 16, the connection being disengageable for the duration of shift transient by forcing the ring 209 forward against the action of springs 217.

To disengage the clutch 53 during a shift transient, an annular piston 54 is siuated rearwardly from the clutch and fits on an annular shelf 219 of the transmission housing 206. Piston 54 is actuated by the application of air pressure to the rearward side thereof through a passage 221 in housing 206. Such piston movement is transmitted to an annular plate 222 through a thrust bearing 223 which provides for rotation of the plate 222 with hub 77 and other elements of the clutch 53. Plate 222 extends radially to abut the ends of a second series of pins 224 which project rearwardly from ring 209 so that forward movement of piston 54 forces the ring forward and effects the desired disengagement of teeth 212 and 213.

The overrunning clutch mechanism 52 which functions as the coupling between the hub 77 and sleeve 208 when the solid drive clutch 53 is disengaged is comprised of alternated plates 226 and discs 227, the discs being splined to the radially outermost surface of sleeve 208. Plates 226 are splined to the inner surface of a drum member 228 which encircles the disc and plate assembly and which has an inwardly directed section 229 at the rearward end against which the assembly of discs 227 and plates 226 may be compressed by forward movement of drum member 228 acting on an annular projection 231 of hub 77. Compression of the plates 226 and discs 227 in this manner locks sleeve 208 to hub 77 to transmit drive from the gearing section output shaft 51 to the transmission output 16.

As hereinbefore discussed, clutch 52 functions to decouple the transmission gearing section 13 from the transmission output 16 at the start of a shift transient so that the gearing section may be braked to a stop, and subsequently to recouple the gearing section to the transmission output after reacceleration of the gearing section to a corresponding speed. To provide for automatic engagement and disengagement of the output clutch 52 for this purpose, a set of external teeth 232 on hub 77 engage with internal teeth 233 on the adjacent inside surface of drum 228. Referring now to FIG. 8 in conjunction with FIG. 6c, both such sets of teeth 232 and 233 are helical and inclined with respect to the axis of hub 77 and drum 228 so that the teeth 233 of drum 228 tend to be urged forwardly or rearwardly according to the direction in which drive is being transmitted between the two members. The forward movement of the teeth 233 and drum 228 acts to engage the clutch mechanism 52 while rearward movement of teeth 233 decouples the clutch. Thus, upon braking of the transmission gearing section, hub 77 tends to slow relative to the drum 228 causing teeth 233 to move rearwardly and disengage the clutch 52. After acceleration of the transmission gearing section at the completion of the shift transient, teeth 233 are urged forwardly causing reengagement of the clutch 52 and resumption of drive in the normal non-transient manner. Following such re-engagement of the output coupling clutch 52, the air pressure behind piston 54 is relieved causing springs 217 to re-engage the clutch 53 to provide positive solid drive through the output coupling section 14 and the transmission as a whole. Solid drive clutch 53 serves the further purpose of providing the driving connection between hub 77 and transmission output 16 in reverse gear settings or reverse torque conditions inasmuch as the overriding clutch 52 would tend to disengage at such times.

In order to facilitate engagement of the self-energizing overriding clutch 52 as the transmission gearing section is re-accelerated, a series of compression springs 234 are situated between hub 77 and an inwardly extending member 236 at the forward end of drum 228 to load the series of plates 226 and discs 227.

It will be apparent that transmissions embodying features of the invention may be varied in many respects from the specific examples herein described. Many modifications are possible within the scope of the invention, and it is not intended to limit the invention except as defined in the following claims.

What is claimed is:

1. A drive transmission of the class having rotary input and output elements and providing for a plurality of drive ratios therebetween comprising:
   a gearing section having a plurality of change speed gears and shift means for interconnecting said gears in any of a plurality of predetermined relationships to provide said plurality of drive ratios,
   an input clutch coupled to said input and to said gearing section and having an engaged position and a disengaged position,
   an output clutch coupling said gearing section to said output and having an engaged position and a disengaged position,
   a throughdrive clutch coupled to said input and to said output independently of said change speed gears and having an engaged position and disengaged position, and
   control means initiating disengagement of said input and output clutches and engagement of said throughdrive clutch prior to operation of said shift means and initiating re-engagement of said input clutch and said output clutch and disengagement of said throughdrive clutch following actuation of said shift means.

2. A drive transmission as defined in claim 1 further comprising a brake coupled to said gearing section, and wherein said control means is coupled to said brake to operate said brake following disengagement of said input clutch and to release said brake prior to engagement of said input clutch.

3. A drive transmission as defined in claim 2 further comprising a friction drive mechanism coupled between said gearing section and said transmission input whereby initial re-acceleration of said gearing section is effected through said friction drive mechanism after release of said brake and prior to full engagement of said input clutch, said friction drive mechanism being slippable during operation of said brake.

4. A drive transmission as defined in claim 1 wherein said input clutch has a torque capacity which varies in response to variations in the angular velocity of said transmission input.

5. A drive transmission as defined in claim 4 wherein said input clutch is comprised of:
   at least one rotatable driving member and at least one rotatable driven member,
   an actuating element which exerts a predetermined force against said members to engage said members through friction, and
   a fluid volume which rotates with said driving element and exerts a centrifugally generated force on said actuating element to modify said predetermined force thereof in response to changes of the angular velocity of said driving member.

6. A drive transmission as defined in claim 5 wherein said fluid volume is positioned to exert said centrifugally generated force in opposition to said predetermined force of said actuating element.

7. A drive transmission as defined in claim 5 further comprising:
   a spring acting on said actuating element of said input clutch to produce said predetermined force which tends to hold said input clutch engaged, and
   a control member movable to relieve said spring force against said actuating element and to apply said spring force to said throughdrive clutch whereby said input clutch is disengaged and said throughdrive clutch is engaged.

8. A drive transmission as defined in claim 7 further comprising a stop positioned to block continued movement of said actuating element by said control member after disengagement of said input clutch and prior to full engagement of said throughdrive clutch whereby continued movement of said control member applies the force of said spring to said throughdrive clutch while preventing said centrifugally generated force from acting thereon.

9. A drive transmission as defined in claim 1 wherein said output clutch is comprised of clutch mechanism of the self-energizing, overrunning class having driving and driven members which transmit drive from said gearing section to said output and which disengages when the angular velocity of the driven member exceeds that of the driving member.

10. A drive transmission as defined in claim 9 wherein said output clutch further comprises a disengageable solid drive clutch mechanism forming a second driving connection between said gearing section and said output, said control means being operative to disengage said solid drive clutch mechanism prior to operation of said shift means and to re-engage said solid drive clutch mechanism following actuation thereof.

11. A drive transmission as defined in claim 1 wherein said gearing section is comprised of
   a principal shaft having a first portion of said change speed gears disposed coaxially thereon, with at least one of said gears being rotatable relative thereto,
   at least one countershaft having a second portion of said change speed gears disposed coaxially thereon with each being permanently engaged with one of said first portion of said gears, at least one of said gears on said countershaft being rotatable thereon, and wherein said means for interconnecting said gears in any of a plurality of predetermined relationships comprises clutch members which are operative when engaged to couple adjacent ones of said first portion of said gears and to couple adjacent ones of said second portion of said gears, at least one of said clutch members at said principal shaft being operative when engaged to form a direct coupling between an adjacent pair of gears which pair includes said gear that is rotatable relative to said principal shaft.

12. A drive transmission defined in claim 1 wherein said control means comprises:

a manually manipulatable shift element having a plurality of positions corresponding to separate ones of said plurality of drive ratios, at least one fluid powered clutch piston actuated by movement of said shift element between positions thereof to force said input clutch towards said disengaged position thereof and to force said through-drive clutch towards said engaged position thereof, a plurality of fluid powered shift pistons operatively coupled to said shift means of said gearing section and actuated by said movement of said shift element between positions thereof after actuation of said clutch piston, and means relieving the fluid pressure on said clutch piston following actuation of said shift pistons.

13. A drive transmission as defined in claim 12 wherein said output clutch is comprised of an overrunning clutch mechanism and a solid drive clutch mechanism each coupled between said gearing section and said transmission output and wherein said control means further comprises a fluid powered output clutch piston actuated by said movement of said shift element between said pistons thereof to disengage said solid drive clutch mechanism prior to actuation of said shift pistons and to re-engage said solid drive clutch mechanism following actuation of said shift pistons.

14. In a drive transmission of the class having rotary input and output elements and providing for a plurality of drive ratios therebetween, the combination comprising;

a plurality of change speed gears which are interconnectable in any of a plurality of predetermined relationships to provide said plurality of drive ratios, an input clutch coupled between said input and said change speed gears and having an engaged position and a disengaged position, an output clutch coupled between said change speed gears and said output and having an engaged position and a disengaged position, a brake operative to stop said change speed gears and having an engaged position and a disengaged position, control means for initiating disengagement of said input and output clutches and engagement of said brake prior to operation of said shift means and for initiating re-engagement of said input clutch and said output clutch and disengagement of said brake following actuation of said shift means, and a friction drive element coupled between said input and said change speed gears independently of said input clutch whereby some initial re-acceleration of said change speed gears is effected through said friction drive element after release of said brake and prior to full engagement of said input clutch, said friction drive element being slippable during engagement of said brake.

15. A drive transmission of the class having rotary input and output elements and providing for a plurality of drive ratios therebetween comprising:

a gearing section having a plurality of change speed gears and shift means for interconnecting said gears in any of a plurality of predetermined relationships to provide said plurality of drive ratios, an input clutch coupled to said input and to said gearing section and having an engaged position and a disengaged position, said input clutch having at least one driving member coupled to said input and at least one driven member coupled to said change speed gears and means exerting a predetermined force on said members to engage said members through friction, and having a fluid volume which rotates with said driving members and exerts a centrifugally generated force thereon whereby said input clutch has a torque capacity which varies as a function of the angular velocity of said transmission input element, an output clutch coupling said gearing section to said output and having an engaged position and a disengaged position, a brake operative to stop said gearing section and having an engaged position and a disengaged position, and fluid pressure operated control means initiating disengagement of said input and output clutches and engagement of said brake prior to operation of said shift means and initiating re-engagement of said input clutch and said output clutch and disengagement of said brake following actuation of said shift means.

16. A drive transmission as defined in claim 15 wherein said fluid volume is positioned to exert said centrifugally generated force in opposition to said predetermined force.

References Cited

UNITED STATES PATENTS

| 1,284,057 | 11/1918 | Campodonico | 74—339 |
|---|---|---|---|
| 1,541,240 | 6/1925 | Barkeij | 74—340 X |
| 1,739,946 | 12/1929 | Carhart | 74—340 X |
| 2,011,734 | 8/1935 | Sinclair | 74—340 X |
| 2,034,767 | 3/1936 | Neracher | 74—340 |
| 2,328,519 | 8/1943 | Wahlberg et al. | 74—340 X |
| 2,403,378 | 7/1946 | Kilpela | 74—359 X |
| 2,427,653 | 9/1947 | Banker | 74—359 X |
| 2,713,798 | 7/1955 | Herndon | 74—339 X |
| 2,726,748 | 12/1955 | Quistgaard et al. | |
| 2,862,398 | 12/1958 | Zeidler et al. | 74—339 |

FOREIGN PATENTS

| 1,219,046 | 12/1959 | France. |
|---|---|---|
| 923,402 | 12/1955 | Germany. |
| 430,699 | 6/1935 | Great Britain. |

DONLEY J. STOCKING, Primary Examiner

T. C. PERRY, Assistant Examiner

U.S. Cl. X.R.

192—3.5, 18, 48.3, 106